(12) United States Patent
McGaa

(10) Patent No.: US 6,342,089 B1
(45) Date of Patent: Jan. 29, 2002

(54) DIRECT REDUCED IRON PELLETS

(76) Inventor: John R. McGaa, 1078 S. Century Ave., St. Paul, MN (US) 55119

( * ) Notice: Subject to any disclaimer, the term of this patent is extended or adjusted under 35 U.S.C. 154(b) by 0 days.

(21) Appl. No.: 09/455,561

(22) Filed: Dec. 6, 1999

Related U.S. Application Data

(63) Continuation-in-part of application No. 08/922,989, filed on Sep. 2, 1997, now abandoned.

(51) Int. Cl.$^7$ ................................................ C22B 1/16
(52) U.S. Cl. ............................ 75/319; 75/320; 75/765; 75/766; 75/962
(58) Field of Search ........................... 75/765, 962, 766, 75/319, 320

(56) References Cited

U.S. PATENT DOCUMENTS

| | | | |
|---|---|---|---|
| 2,417,493 A | | 3/1947 | Holz ................................ 75/3 |
| 3,212,877 A | | 10/1965 | Rueckl ............................ 75/3 |
| 3,326,668 A | | 6/1967 | Anthes et al. .................... 75/3 |
| 3,525,784 A | | 8/1970 | Endell .......................... 264/63 |
| 3,765,869 A | | 10/1973 | Schierloh ......................... 75/3 |
| 3,811,865 A | | 5/1974 | Ladell ............................. 75/3 |
| 3,819,360 A | | 6/1974 | Adams et al. .................... 75/3 |
| 3,865,574 A | * | 2/1975 | Long et al. ................... 75/749 |
| 3,886,244 A | | 5/1975 | Bayer et al. .................. 264/44 |
| 4,247,323 A | * | 1/1981 | Serbent et al. ................ 75/497 |
| 4,409,022 A | * | 10/1983 | Kurozu ........................ 75/479 |
| 4,474,603 A | | 10/1984 | Vadis ............................. 75/3 |
| 4,702,766 A | | 10/1987 | Love et al. ..................... 75/34 |
| 4,725,309 A | | 2/1988 | MacKay et al. ................ 75/34 |
| 5,078,787 A | | 1/1992 | Becerra-Novoa et al. ..... 75/443 |
| 5,078,788 A | | 1/1992 | Bueno C. et al. ............. 75/495 |
| 5,169,434 A | * | 12/1992 | Kumasaka et al. ........... 75/766 |
| 5,387,274 A | | 2/1995 | Dam G. et al. ................ 75/495 |
| 5,498,277 A | * | 3/1996 | Floyd et al. .................. 75/385 |
| 5,591,247 A | * | 1/1997 | Dumont et al. ............... 75/961 |
| 5,681,367 A | | 10/1997 | Hunter ...................... 75/10.63 |

FOREIGN PATENT DOCUMENTS

| | | | |
|---|---|---|---|
| AU | 229201 | 2/1958 | ................ 75/477 |

OTHER PUBLICATIONS

Ball et al, Agglomeration of Iron Ores, 1973 pp. 304–305.*

* cited by examiner

*Primary Examiner*—Roy King
*Assistant Examiner*—Tima M. McGuthry-Banks
(74) *Attorney, Agent, or Firm*—Kinney & Lange, P.A.

(57) ABSTRACT

A method for producing the direct reduced iron pellets. The method includes pelletizing, iron oxide-containing material, internal reductant and binder to form green pellets. The binder includes a non-combustible fibrous material. The method also includes firing the green pellets to convert the green pellets into direct reduced iron pellets.

52 Claims, No Drawings

DIRECT REDUCED IRON PELLETS

CROSS-REFERENCE TO RELATED APPLICATION(S)

This is a continuation-in-part of Application Ser. No. 08/922,989 filed Sept. 2, 1997 now abandoned.

BACKGROUND OF THE INVENTION

The present invention relates to direct reduced iron pellets. More particularly, the present invention relates to direct reduced iron pellets that are produced with a novel binder that allows the direct reduced iron pellets to be at least partially formed from by-products of iron and steelmaking processes.

Iron oxide-containing materials used in iron and steelmaking processes, such as taconite, typically contain high concentrations of gangue in addition to the iron oxide. It is known that the iron concentration may be enriched by finely grinding the iron oxide-containing materials and then magnetically separating the iron oxide from the gangue. The refined, finely ground iron is then mixed with a binder and formed into pellets which are referred to as green pellets.

Green pellets commonly have a relatively low compressive strength that makes it difficult to handle the green pellets without the green pellets experiencing a high degree of degradation. However, firing green pellets has been found to increase the compressive strength of the pellets and harden the pellets.

Firing green pellets in a reducing atmosphere, such as a mixture of carbon monoxide and hydrogen, not only strengthens the green pellets but also converts iron oxide in the pellets to metallic iron. Pellets containing high concentrations of metallic iron are referred to as direct reduced iron pellets. The highly metallized nature and high purity of direct reduced iron pellets makes it desirable to use direct reduced iron pellets for production of steel by smelting in electric furnaces or various other techniques.

Prior art methods for producing direct reduced iron require the use of high grade iron as well as large amounts of gaseous reductants, such as natural gas, to produce a direct reduced iron product possessing a high degree of metallization. The prior art methods for producing direct reduced iron pellets also require the use of vertically oriented furnaces to reduce pellet degradation during the firing process.

For example, MacKay et al. U.S. Pat. No. 4,725,309 and Becerra-Nova et al. U.S. Pat. No. 5,078,787 disclose feeding the green pellets into the top of a vertical shaft moving bed furnace. A reducing gas, such as natural gas, is then injected into the furnace in a direction that is substantially countercurrent to the flow of pellets in the furnace. Contact between the green pellets and the reducing gas causes iron oxide in the green pellets to be metallized and thereby converts the green pellets into direct reduced iron pellets.

Bueno C. et al. U.S. Pat. No. 5,078,788 discloses a similar process for fabricating direct reduced iron pellets. However, Bueno C. et al. includes a preliminary step of cracking a heavy hydrocarbon oil to produce a methane-rich gas, which is used to reduce the iron oxide to metallic iron.

Other processes for converting green pellets into direct reduced iron pellets use coal to drive the metallization process. Attempts have been made to use rotary kiln furnaces with coal-based reduction processes because it is possible to operate rotary kiln furnaces in a cost effective manner. However, the use of rotary kiln furnaces in coal-based reduction processes has previously been undesirable because tumbling of pellets in the rotary kiln furnace causes a significant portion of the pellets to degrade into fines. The degradation of pellets into fines is undesirable because fines lead to the formation of accretions on the walls of the rotary kiln furnace. Build up of accretions eventually reduces the productivity of the rotary kiln furnace to an extent that the rotary kiln furnace must be shut down so that the accretions may be removed.

To minimize the formation of accretions in rotary kiln furnaces, prior art processes commonly use induration techniques to hardened the green pellets prior to firing. However, indurated pellets must be fired for longer periods of time to obtain desirable metallization levels because induration increases the density of the pellets. This factor alone dramatically reduces the rate at which direct reduced iron pellets may be produced using coal-based reduction processes in rotary kiln furnaces.

Coal-based direct reduced iron processes have also been used with rotary hearth furnaces. While pellet degradation is reduced in rotary hearth firing processes, rotary hearth firing processes require capital and maintenance costs that are substantially greater than rotary kiln furnaces.

Another consideration when preparing direct reduced iron pellets is the ability to fabricate the pellets using by-products from iron and steelmaking processes. Iron and steelmaking processes annually generate millions of tons of by-products that must either be recycled or disposed. These by-products are commonly referred to as reverts and include a variety of furnace dusts and sludges. While it is desirable to reuse the reverts because the reverts contain high levels of iron and carbon, directly recycling reverts in a commercially viable manner has not previously been possible because reverts typically contain small but significant concentrations of heavy metals, such as lead and zinc.

Landfilling reverts is undesirable because of uncertainty regarding potential toxic affects caused by heavy metals leaching from the landfilled material. The ability of steelmaking companies to landfill certain forms of reverts, such as electric arc furnace dust, is further limited because high lead levels have caused the Environmental Protection Agency (hereinafter EPA) to list some of these reverts as hazardous waste.

Another important consideration in producing green pellets with desirable compressive strength characteristics is the selection of an appropriate binder. While it is desirable to use a strong binder that precludes pellet degradation, it is desirable to select a binder that minimizes the introduction of impurities into the pellet because any impurities introduced into the pellets must be removed at some point in the steelmaking process.

One of the most commonly used binders in the production of green pellets is bentonite. Various other materials have been used as binders in the fabrication of green pellets. For example, Ruckl, U.S. Pat. No. 3,212,877 describes a binder that is prepared from a carbonaceous material that softens but remains viscous during the firing process. Anthes et al. U.S. Pat. No. 3,326,668 discloses using fibrous material, such as peat moss, as a binder. Laydell, U.S. Pat. No. 3,811,865 discloses using tree bark as a binder. Vadis, U.S. Pat. No. 4,474,603 teaches using Gyttja as a binder.

Preparing a binder from a finely divided shale, which is obtained from washing coal, is taught in Endell, U.S. Pat. No. 3,525,784. Using a double salt of potash-magnesia as a binder is described in Adams et al., U.S. Pat. No. 3,819,360.

None of the preceding binders, when used alone or in combination, have allowed the production of direct reduced iron pellets that possess desirable compressive strength, metallization, and residual carbon levels when the direct reduced iron pellets are fabricated with a significant concentration of reverts.

SUMMARY OF THE INVENTION

The present invention includes a method for producing direct reduced iron pellets. The method includes pelletizing an agglomeration of iron oxide-containing material, internal reductant, and binder to form green pellets. The method also includes a step of firing the green pellets in a furnace to convert the green pellets into the direct reduced iron pellets.

The binder used in the present invention includes a non-combustible fibrous material. The binder has a sufficient binding capacity to maintain the integrity of the pellet throughout the firing process.

DETAILED DESCRIPTION OF THE PREFERRED EMBODIMENTS

The present invention includes a process for producing direct reduced iron pellets. The direct reduced iron pellets are prepared by metallizing green pellets. The green pellets are produced from an agglomeration of iron oxide-containing material, internal reductant, and binder.

The method of the present invention produces a durable unfired carbonaceous green pellets. The durable carbonaceous pellets allow for dramatic increases in kiln productivity by increasing pellet reactivity, decreasing residence time requirements, and minimizing the generation of fines. Furthermore, obviating the induration requirement results in a smaller, less complex, cost-effective, and energy efficient process.

Previous attempts to formulate green pellets containing beneficial levels of internal reductants in rotary kiln reduction processes have been dismissed as problematic because of pellet degradation. Degradation of pellets within the rotary kiln not only results in poor product recovery but also promotes "ringing," a deleterious build-up of accretions inside the rotary kiln. These accretions are a difficult and costly phenomenon that lead to frequent downtime involving a total cool down of the kiln and subsequent labor intensive removal of the accretions with pneumatic tools.

The present invention has the ability to utilize a variety of iron oxide-containing materials regardless of gangue, ferric iron, ferrous iron, and total iron content. Iron ore, such as is obtained from taconite, may be utilized in the iron oxide-containing material. The iron oxide-containing material may also include reverts that are used alone or in conjunction with iron ore. Reverts that are particularly suitable for use with the present invention include a variety of furnace dusts and sludges, such as basic oxygen furnace dust, blast furnace dust, and millscale. Other similar mineral wastes, such as iron oxide waste produced from illminite processing, may also be used in producing direct reduced iron pellets according to the present invention.

The iron oxide-containing material is capable of being formed from any blend of iron ore and reverts ranging from pure iron ore to pure reverts. Preferably, the iron oxide-containing material contains a mixture of iron ore and reverts that are mixed in a ratio of between about 19/1 to 1/1. Formulating green pellets with this blend of iron oxide-containing material produces green pellets that are easy to pelletize, have improved durability, sufficient porosity, and allow for higher metallization rates.

When iron ore is used in formulating the iron oxide-containing material, the iron content in the iron ore is preferably enriched using conventionally known comminution and benefication processes. These processes preferably include ballmill pulverizing the iron ore to minus 325 mesh. As used herein all references to mesh refer to U.S. mesh classification set forth in ASTM E-11-61.

The particle size of the iron oxide-containing material used to formulate the green pellets directly affects the strength, durability, and metallization of the direct reduced iron pellets prepared from the green pellets. Preferably, the iron oxide-containing material is finely ground to increase the surface area of the material. Increasing the surface area of the material also increases the reactivity of the iron oxide-containing material which leads to a higher level of metallization. Furnace dust is ideally suited because of its ultrafine, submicron particle size. Preferably, the iron oxide-containing material is ground to a granulation such that greater than 50 percent of the iron oxide-containing material is minus 325 mesh. As used herein, the term "minus" means that the specified percentage of ground material has a particle size that is less than the specified mesh size. Similarly, the term "plus" means that the specified percentage of ground material has a particle size that is greater than the specified mesh size.

Another consideration when formulating green pellets is that the green pellets should minimize generation of volatiles. Volatiles, such as carbon monoxide, hydrogen gas, steam, or any combination thereof, are typically generated during the metallization process if green pellets are formulated to include high levels of volatile carbon or water. Carbon, heated in the presence of water generates volatiles, such as carbon monoxide and hydrogen. Additionally, any water present within a green pellet is transformed into steam under the firing conditions of the metallization process. Gradual release of the volatiles generated during the metallization process is critical to retaining a high level of pellet integrity. If the volatiles generated during the metallization process do not exit the green pellets at a quick enough rate during firing, the green pellets develop an internal pressure that results in unacceptable pellet degradation. Preferably, minimal levels of volatile carbon, and little, if any, water are used to formulate the green pellets.

While direct reduced iron pellets may be produced without the use of internal reductants, adding internal reductants to the green pellets allows desired metallization levels to be obtained in shorter firing durations. The level of internal reductants is preferably identified by the internal fixed carbon content of the green pellets.

The internal fixed carbon content is the fixed carbon content internal to the green pellet before firing. Internal fixed carbon content is distinguished from residual carbon, which refers to the fixed carbon content internal to the pellet after firing. Internal fixed carbon content is also distinguished from external carbon, which is distinct from the pellet and used to prevent sticking of the pellets during the metallization process.

Insufficient internal fixed carbon content leads to direct reduced iron pellets with low metallization. Higher internal fixed carbon content results in direct reduced iron pellets with a greater degree of metallization as well as a higher level of residual carbon. However, excessive internal fixed carbon content causes the direct reduced iron pellets to exhibit unacceptably low fired compressive strengths and causes unacceptable pellet degradation. Preferably, the internal fixed carbon content is between about 7 and 17 percent. Unless referred to otherwise, all references to percent in this application refer to percent by weight.

The optimum internal fixed carbon content is affected by the type and amount of internal reductants used in formulating the green pellets. Internal reductants with high levels of volatile carbon tend to weaken the direct reduced iron pellets. Accordingly, internal reductants having low volatile carbon levels, such as coke, coke breeze, and coal char, should be used. However, it is possible to formulate the green pellets with other internal reductants that contain higher levels of volatile carbon, such as coal and lignite, because these items are relatively less expensive and typically more abundant. Pellets that contain appreciable volatile carbon typically require additional binder to increase pellet strength.

The internal fixed carbon content may also be adjusted by formulating the green pellets with reverts, such as blast furnace dust and blast furnace sludge, that contain significant levels of carbon. Additionally, carbonaceous materials, such as petroleum coke and carbon-bearing, battery waste, can be used in producing green pellets with a desired internal fixed carbon content.

The concentration of internal reductant in the green pellet can be between about 2 and 20 percent and preferably between approximately 7 and 17 percent. At internal reductant concentrations of less than about 7 percent, the green pellets become increasingly reliant on external reductants to complete the metallization process. Relying on external reductants to complete the metallization reaction is undesirable because metallization using external reductants involves a slower reaction mechanism than metallization using internal reductants.

The internal reductants should be finely pulverized to increase the particle surface area. Increasing, the surface of the internal reductants enhances the reactivity of the internal reductants and allows the internal reductants to be more intimately mixed with the iron oxide-containing material and the binder in the green pellets. However, finely grinding the internal reductants causes a greater proportion of the internal reductants to be consumed during the metallization process and thereby produces direct reduced iron pellets with smaller levels of residual carbon. Preferably, the internal reductant is pulverized to granulation where greater than 50 percent of the internal reductant is minus 325 mesh. Further grinding of the internal reductants may be desirable to further enhance the reactivity of the internal reductants.

Coke and coal char are preferably used as internal reductants. Using finely ground coke or coal char provides significantly less dusting than coarsely ground coke or coal char. However, using coarsely ground coke or coal char provides more residual carbon than the finely ground coke or coal char. When coal is used as the internal reductant, the coal is preferably pulverized to approximately 80 percent minus 325 mesh. Coal char is prepared by heating coal to a temperature of at least 350° C. in a reducing to neutral atmosphere for approximately one hour and then pulverizing to the same granulation as coal.

Mixtures incorporating submicron iron oxides such as basic oxygen furnace dust and finely ground iron oxides tend to metallize more rapidly, yielding relatively stronger more durable direct reduced iron pellets. Therefore higher internal fixed carbon contents can be used when fomulating green pellets from iron ores and finely ground iron oxides without the fired compressive strength of the pellets becoming undesirably low.

The binder used in formulating the green pellets influences the strength and durability characteristics of the green pellets as well as the direct reduced iron pellets. The optimum binder concentration of binder used in formulating the green pellets depends on the iron oxide-containing material, internal reductant, and internal fixed carbon content of the green pellets. For example, higher internal fixed carbon content tends to produce weaker agglomerates and therefore requires a higher binder concentration. Formulating the pellets with a binder concentration of up to 10 percent and preferably between approximately 1 and 5 percent provides the green pellets with adequate compressive strength to withstand degradation during fabrication and transportation.

The binder preferably includes a mixture of bentonite and a non-combustible fibrous material. Bentonite is preferably added to the pellet mixture at a concentration of between about 0 and 4 percent. Adding bentonite at a concentration of greater than 4 percent produces an agglomeration that is excessively plastic because of bentonite's high rate of water absorbency.

It has surprisingly been found that using non-combustible fibrous materials as in the binder dramatically increases the durability of green pellets throughout the firing process as well as during the transportation of the direct reduced iron pellets. Non-combustible fibrous material, such as mineral wool, glass wool or fiberglass, may be produced from iron and steelmaking slag using conventionally known technology. The non-combustible fibrous material is added to the pellet mixture at a concentration of up to about 10 percent. Preferably, the non-combustible fibrous material is added to the pellet mixture at a concentration of between about 1 and 4 percent.

As an alternative to using bentonite as a binder, paper mill tar may be used with the non-combustible fibrous material. Paper mill tar, which is also known as ammonium lignin sulfonate, is a by-product of paper manufacturing processes that is similar in character to molasses.

Other organic binders such as starch, cellulose, molasses, or tar may also be used as a binder in formulating the green pellets of the present invention. Organic binders enhance the durability of the green pellets prior to firing, which is important when material handling systems involve particularly rough conditions. However, many organic binders combust at temperatures of greater than 200 to 300° C. Combustion of the binder not only decreases the strength of the pellets by reducing the amount of the binder in the pellets but also further reduces the strength of the pellets through the evolution of volatiles.

Inorganic binders, other than bentonite, may also be used in formulating the green pellets of the present invention. Inorganic binders are typically formed from gangue materials, such as calcium-aluminium silicates. However, the level of inorganic binders in the green pellets should be minimized because inorganic binders dilute the purity of the direct reduced iron pellets.

The agglomerate of iron oxide-containing materials, internal reductant, and binder is preferably formed into pellets using either extrusion or other conventionally known pelletizing techniques. When extrusion is used to form the green pellets, the extruder is preferably selected with a diameter of less than approximately 2 centimeters. Pellets with this nominal size allow the firing process to be completed within a commercially feasible time period.

A variety of furnace configurations may be used to fire the green pellets and thereby convert the green pellets into direct reduced iron pellets. It has been found that preferably using a rotary kiln furnace allows direct reduced iron pellets with desirable metallization rates to be produced in a cost-effective manner.

Factors affecting the preferred firing temperature include refractory type, fuel type, external reductant type, pellets degradation (dusting), and low melting point phases such as wustite and fayalite (ferrous oxide and iron silicate). For most compositions firing the pellets at temperatures of between about 1,050° C. and 1,250° C. produces desirable metallization rates. Preferably, firing is performed at a temperature of approximately 1,150° C.

To achieve acceptable zinc levels when firing green pellets at a temperature of approximately 1,100° C. the pellets have to be formulated with a fixed internal carbon content of between 15 and 20 percent. However, using fixed internal carbon contents in this range produces direct reduced iron pellets with low fired compressive strengths.

Alternatively, firing green pellets at a temperature of approximately 1,150° C. for 10 minutes produces direct reduced iron pellets with acceptable compressive strength and zinc levels with a moderate fixed internal carbon content of approximately 10 percent.

When a firing temperature of about 1,150° C. is used, the green pellets are fired for approximately 1 hour. Over the first 50 minutes, the temperature of the pellet increases from ambient temperature to approximately 1,150° C. at a rate of between about 40 and 50° C. per minute. The furnace is then maintained at a temperature of approximately 1,150° C. for about 10 minutes.

The green pellets are preferably charged into the rotary kiln furnace along with external carbon. The coal or coke that is charged into the furnace along with the pellets is identified as external carbon because it is distinct from the carbon that is used in formulating the green pellets. The external coal assists the metallization process and thereby allows the firing duration to be shortened. External carbon also prevents the pellets from sticking to each other and to the reactor wall during the metallization process by decreasing the length of time that low melting point ferrous compounds on the outside of the pellets are in a sticky phase.

The external carbon is preferably added at approximately 10–30 percent of the total furnace charge. The external carbon preferably has a relatively coarse grind with a size distribution such that the diameter is coarser than ⅛ of an inch.

It has been found that when direct reduced iron pellets produced according to the present invention are fired at temperatures of approximately 1,150° C., zinc oxide that may be initially present in the green pellets is converted into metallic zinc. The metallic zinc is then volatilized out of the pellets and swept away in the combustion gases. The metallic zinc is preferably recovered by converting to zinc oxide and then collecting in an off-gas scrubber. The process of the present invention thereby produces direct reduced iron pellets containing acceptable zinc levels.

In certain circumstances, it is desirable to add lime, commonly referred to as flux, to the green pellets because lime absorbs sulfur evolved from the pellets during firing and other parts of the steelmaking process. Prior to the present invention, incorporation of lime into pellets weakened the pellets and thereby produced unacceptable degradation rates. Pellets produced according to the present invention, however, exhibit acceptable degradation rates even when the pellets are formulated with lime. Because of the ability of the present invention to produce pellets with desirably low degradation rates, the present invention allows pellets to be formulated using reverts that contain effective levels of lime.

The following example is provided to further illustrate aspects of the invention. The example is not intended to limit the scope of this invention.

EXAMPLE 1

The effect of flux and fiber additions on the degree of pellet degradation was studied. Green pellets were formed from a mixture of 79 percent iron oxide-containing material, 17 percent coal char and 4 percent binder. The binder was a mixture of the bentonite and paper mill tar. The iron oxide-containing material was prepared by mixing iron ore and basic oxygen furnace dust at ratio of 9 to 1. The iron oxide containing material and the coal char used in formulating the green pellets were finely pulverized to finer than 70 percent minus 325 mesh. To this stock mixture was admixed flux at concentrations of either 0, 2, and 4 percent. The flux used was a commercially available, metallurgical grade, limestone-dolomitic lime mixture. Depending on the green pellet formulation, a non-combustible fibrous binder was mixed into the mixture at a concentration of about 1 percent.

The iron oxide-containing material, coke, and binder were mixed together until a relatively homogenous agglomeration was obtained. Greens pellets were formed by extruding the agglomeration through an extruder having a diameter of approximately 1 centimeter. The green pellets had a nominal size of approximately 1 centimeter in diameter and about 2 centimeters in length.

The green pellets were then charged into a rotary kiln furnace along with external carbon. The external carbon was added at a concentration of approximately 20 percent of the total furnace charge. The external carbon had a particle size of approximately ⅛ of an inch diameter.

The firing was performed over approximately 1 hour. During the first 50 minutes, the temperature in the rotary kiln furnace was increased from ambient temperature to approximately 1,150° C. at a rate of between about 40 and 50° C. per minute. The furnace was then maintained at a temperature of approximately 1,150° C. for about 10 minutes.

The firing process converted the green pellets into direct reduced iron pellets. The direct reduced iron pellets were allowed to cool and the fired compressive strengths degradation, and metallization were measured for each of the mixtures. The results of these tests are reported in Table 1.

TABLE 1

| Concentration of Flux (percent) | Fibrous Binder (yes/no) | Pellet Degradation (percent) |
| --- | --- | --- |
| 0 (no flux) | no | 12 |
| 0 (no flux) | yes | 1 |
| 2 | no | 32 |
| 2 | yes | 2 |
| 4 | no | 25 |
| 4 | yes | 4 |

Pellet degradation was adversely affected by flux addition. Addition of flux doubled the degradation rate for those pellets formulated without non-combustible fibrous binder. However with the addition of non-combustible fibrous binder, pellet degradation rates dramatically improved. Acceptable pellet degradation rates were achieved only when the binder contained non-combustible fibrous binder.

Although the present invention has been described with reference to preferred embodiments, workers skilled in the art will recognize that changes may be made in form and detail without departing from the spirit and scope of the invention.

What is claimed is:

1. A method for producing a direct reduced iron pellet, the method comprising:

pelletizing iron oxide-containing material, internal reductant and binder to form green pellets, wherein the binder includes a non-combustible fibrous material and wherein greater than 50 percent by weight of the internal reductant has a minus 200 mesh; and firing the green pellets to convert the green pellets into direct reduced iron pellets.

2. The method of claim 1, wherein the direct reduced iron pellets have a metallization level of greater than 80 percent by weight.

3. The method of claim 1, wherein the direct reduced iron pellets have a residual carbon content of greater than 0.1 percent by weight.

4. The method of claim 1, and further comprising grinding the iron oxide-containing material to where greater than 50 percent by weight of the iron oxide-containing material has a minus 325 mesh.

5. The method of claim 4, wherein the iron oxide-containing material is iron ore.

6. The method of claim 5, wherein the iron oxide-containing material further comprises basic oxygen furnace dust, blast furnace dust, millscale, or other by-products from iron or steelmaking processes.

7. The method of claim 5, wherein the concentration of iron ore in green pellets is between about 50 and 95 percent by weight.

8. The method of claim 1, wherein the green pellets have an internal reductant concentration of between about 2 and 20 percent by weight.

9. The method of claim 1, wherein the internal reductant is coke, coke breeze, coal char, lignite, coal, blast furnace dust, blast furnace sludge, petroleum coke, carbon-bearing battery waste, or other carbonaceous materials.

10. The method of claim 1, wherein the green pellets have a binder concentration of between approximately 1 and 5 percent by weight.

11. The method of claim 1, wherein the non-combustible fibrous material is mineral wool, glass wool, fiberglass, or asbestos fiber.

12. The method of claim 11, wherein the binder further comprises bentonite, ammonium lignin sulfonate, starch, cellulose, molasses, tar, organic fibers, calcium-aluminum silicate, or combinations thereof.

13. The method of claim 1, and further comprising feeding external carbon along with the green pellets into a furnace.

14. The method of claim 13, wherein the external carbon is coke, coke breeze, coal char, lignite, and coal.

15. The method of claim 1, wherein the green pellets are fired in a rotary kiln furnace at a temperature of between about 1,150° C. and 1,250° C.

16. The method of claim 15, wherein the green pellets are heated from ambient temperature to a firing temperature in excess of 1,100° C. over about 50 minutes and then the green pellets are maintained at firing temperature for at least 5 minutes.

17. A green pellet for producing a direct reduced iron pellet, the green pellet comprising:

an iron oxide-containing material;

approximately 2 to 20 percent by weight of the internal reductant wherein the internal reductant has been ground to a granulation wherein greater than 50 percent by weight of the internal reductant has a minus 325 mesh; and appioximately 1 to 5 percent by weight of binder, wherein the binder includes a non-combustible fibrous material.

18. The green pellet of claim 17, wherein the direct reduced iron pellets have a metallization level of greater than 80 percent by weight.

19. The green pellet of claim 17, wherein the direct reduced iron pellets have a residual carbon content of greater than 0.1 percent by weight.

20. The green pellet of claim 19, wherein the iron oxide-containing material is ground to greater than 50 percent by weight minus 325 mesh.

21. The green pellet of claim 17, wherein the iron oxide-containing material is iron ore.

22. The green pellet of claim 21, wherein the iron oxide-containing material further comprises basic oxygen dust, blast furnace dust, millscale dust, or other by-products from iron or steelmaking processes.

23. The green pellet of claim 22, wherein the iron oxide-containing materials contains steelmill reverts at a concentration of between about 5 and 5 percent by weight.

24. The green pellet of claim 17, wherein the internal reductant is coke, coke breeze, coal char, lignite, blast furnace dust, blast furnace sludge, petroleum coke, carbon-bearing battery waste, or other carbonaceous materials.

25. The green pellet of claim 17, wherein the green pellets have a binder concentration of between approximately 1 and 5 percent by weight.

26. The green pellet of claim 17, wherein the non-combustible fibrous material is mineral wool, glass wool, fiberglass, or asbestos fiber.

27. The green pellet of claim 17, wherein the binder further comprises bentonite, ammonium lignin sulfonate, starch, ligment, cellulose, molasses, tar, organic fibers, calcium-aluminum silicate, or combinations thereof.

28. A method for producing a direct reduced iron pellet, the method comprising:

pelletizing iron oxide-containing material, internal reductant and binder to form green pellets, wherein the binder includes a non-combustible fibrous material comprising mineral wool, glass wool, fiberglass, asbestos fiber, bentonite, ammonium lignin sulfonate, starch, cellulose, molasses, tar, organic fibers, calcium-aluminum silicate, or combinations thereof, and wherein greater than 50 percent by weight of the internal reductant has a minus 200 mesh; and firing the green pellets to convert the green pellets into direct reduced iron pellets.

29. The method of claim 28, wherein the direct reduced iron pellets have a metallization level of greater than 80 percent by weight.

30. The method of claim 28, wherein the direct reduced iron pellets have a residual carbon content of greater than 0.1 percent by weight.

31. The method of claim 28, and further comprising grinding the iron oxide-containing material to where greater than 50 percent by weight of the iron oxide-containing material has a minus 325 mesh.

32. The method of claim 28, wherein the iron oxide-containing material further comprises iron ore, basic oxygen furnace dust, blast furnace dust, millscale, or other by-products from iron or steelmaking processes.

33. The method of claim 28, wherein the concentration of iron ore in green pellets is between about 50 and 95 percent by weight.

34. The method of claim 28, wherein the green pellets have an internal reductant concentration of between about 2 and 20 percent by weight.

35. The method of claim 28, wherein the green pellets have a binder concentration of between approximately 1 and 5 percent by weight.

36. The method of claim 29, wherein the internal reductant is coke, coke breeze, coal char, lignite, coal, blast furnace dust, blast furnace sludge, petroleum coke, carbon-bearing battery waste, or other carbonaceous materials.

37. A green pellet for producing a direct reduced iron pellet, the green pellet comprising:

an iron oxide-containing material;

approximately 2 to 20 percent by weight of internal reductant, wherein greater than 50 percent by weight of the internal reductant has a minus 200 mesh; and approximately 1 to 5 percent by weight of binder, wherein the binder includes a non-combustible fibrous material comprising mineral wool, glass wool, fiberglass, asbestos fiber, bentonite, ammonium lignin sulfonate, starch, cellulose, molasses, tar, organic fibers, calcium-aluminum silicate, or combinations thereof.

38. The green pellet of claim 37, wherein the direct reduced iron pellets have a metallization level of greater than 80 percent by weight.

39. The green pellet of claim 37, wherein the direct reduced iron pellets have a residual carbon content of greater than 0,1 percent by weight.

40. The green pellet of claim 37, wherein the iron oxide-containing material is ground to greater than 50 percent by weight minus 325 mesh.

41. The green pellet of claim 37, wherein the iron oxide-containing material comprises iron ore, basic oxygen furnace dust, blast furnace dust, millscale dust, or other by-products from iron or steelmaking processes.

42. The green pellet of claim 37, wherein the green pellets have a binder concentration of between approximately 1 and 5 percent by weight.

43. A method for producing a direct reduced iron pellet, the method comprising:

pelletizing iron oxide-containing material, internal reductant and binder to form green pellets, wherein the binder includes a non-combustible fibrous material; and firing the green pellets in a rotary kiln furnace at a temperature of between 1,050° C. and 1,250° C. wherein the green pellets are heated from ambient temperature to firing temperature in excess of 1,100° C. over about 50 minutes and then the green pellets are maintained at firing temperature for at least 5 minutes to convert the green pellets into direct reduced iron pellets.

44. The method of claim 43, wherein the direct reduced iron pellets have metallization level of greater than 80 percent by weight.

45. The method of claim 43, wherein the direct reduced iron pellets have a residual carbon content of greater than 0.1 percent by weight.

46. The method of claim 43, and further comprising grinding the iron oxide-containing material to where greater than 50 percent by weight of the iron oxide-containing material has a minus 325 mesh.

47. The method of claim 43, wherein the iron oxide-containing material further comprises iron ore, basic oxygen furnace dust, blast furnace dust, millscale, or other by-products from iron or steelmaking processes.

48. The method of claim 47, wherein the concentration of iron ore in green pellets is between about 50 and 95 percent by weight.

49. The method of claim 43, wherein the green pellets have an internal reductant concentration of between about 2 and 20 percent by weight.

50. The method of claim 43, wherein the internal reductant is coke, coke breeze, coal char, lignite, coal, blast furnace sludge, petroleum coke, carbon-bearing battery waste, or other carbonaceous materials.

51. The method of claim 43, wherein the green pellets have a binder concentration of between approximately 1 and 5 percent by weight.

52. The method of claim 43, and further comprising feeding external carbon along with the green pellets into a furnace.

* * * * *

UNITED STATES PATENT AND TRADEMARK OFFICE
CERTIFICATE OF CORRECTION

PATENT NO.      : 6,342,089 B1
DATED           : January 29, 2002
INVENTOR(S)     : John R. McGaa It is certified that error appears in the above-identified patent and that said Letters Patent is hereby corrected as shown below:s <u>Title page,</u>
Item [57], ABSTRACT,
Line 2, delete "pelletizing,", insert -- pelletizing --

<u>Column 1,</u>
Line 24, delete "pellets,", insert -- pellets --
Line 49, delete "Nova", insert -- Novoa --
Line 50, delete "the" before "green"

<u>Column 2,</u>
Line 40, delete "are", insert -- arc --
Line 57, after "et al.", insert -- , --

<u>Column 5,</u>
Line 58, after "stronger", insert -- , --
Line 59, after "Therefore", insert -- , --
Line 60, delete "fomulating", insert -- formulating --

<u>Column 6,</u>
Line 50, delete "aluminium", insert -- aluminum --

<u>Column 7,</u>
Line 10, after "C", insert -- , --

<u>Column 8,</u>
Line 6, after char, insert -- , --
Line 20, delete "Greens", insert -- Green --
Line 38, delete "strenths", insert -- strength, --

<u>Column 9,</u>
Line 49, delete "1,150", insert -- 1,050 --
Line 60, delete "the" after " of"
Line 66, delete "appioximately", insert -- approximately --

<u>Column 10,</u>
Line 11, after "oxygen", insert -- furnace --
Line 16, after "and", delete "5", insert -- 50 --
Line 28, delete "," after "bentonite"
Line 28, delete "," after "sulfonate"

UNITED STATES PATENT AND TRADEMARK OFFICE
CERTIFICATE OF CORRECTION

PATENT NO. : 6,342,089 B1
DATED : January 29, 2002
INVENTOR(S) : John R. McGaa

It is certified that error appears in the above-identified patent and that said Letters Patent is hereby corrected as shown below:

<u>Column 12,</u>
Line 4, after "at", insert -- a --
Line 8, after "have", insert -- a --
Line 28, after "coal,", insert -- blast furnace dust, --

Signed and Sealed this

Third Day of September, 2002

Attest:

JAMES E. ROGAN
Attesting Officer  Director of the United States Patent and Trademark Office